United States Patent [19]
Strong et al.

[11] Patent Number: 5,346,315
[45] Date of Patent: Sep. 13, 1994

[54] BALL AND SOCKET BEARING ASSEMBLY FOR A RUDDER POST

[75] Inventors: Jeffrey W. Strong, Boca Raton; John R. Newton, Jupiter, both of Fla.

[73] Assignee: Tides Marine, Inc., Boca Raton, Fla.

[21] Appl. No.: 25,618

[22] Filed: May 7, 1993

[51] Int. Cl.⁵ .................. F16C 23/04; B63H 25/06
[52] U.S. Cl. ................... 384/192; 114/169; 384/206
[58] Field of Search ............ 384/192, 193, 202, 203, 384/206, 208, 209, 226; 114/169

[56] References Cited

U.S. PATENT DOCUMENTS

| | | | |
|---|---|---|---|
| 1,025,884 | 5/1912 | Schmitt . | |
| 1,063,389 | 6/1913 | Robbins . | |
| 1,066,584 | 7/1913 | Cookingham et al. | 384/192 |
| 1,067,892 | 7/1913 | Walters . | |
| 2,448,651 | 9/1948 | Aker | 114/169 |
| 2,891,826 | 6/1959 | Josephson et al. | 384/207 |
| 3,381,649 | 5/1968 | Ward | 114/169 |
| 4,809,631 | 3/1989 | Kramer | 114/169 |

FOREIGN PATENT DOCUMENTS

| | | | |
|---|---|---|---|
| 3729102 | 4/1988 | Fed. Rep. of Germany | 384/193 |
| 110092 | 10/1917 | United Kingdom | 114/169 |

*Primary Examiner*—Thomas R. Hannon
*Attorney, Agent, or Firm*—Michael Ebert

[57] ABSTRACT

A ball and socket assembly adapted to engage the post of a rudder installed in the stern of a boat and to maintain it at a proper upright position regardless of the degree to which the post deviates from the vertical and is subjected to hydrodynamic forces which seek to displace the post. The assembly consists of a journal box fixedly mounted on a support and having a spheroidal cavity, and a bearing through which the rudder post extends. The bearing is constituted by a spheroidal section that nests within the cavity of the box and a cylindrical section projecting from the box and pinned to the post whereby the bearing is in alignment with the post and its spheroidal section is caused to rotate within the cavity in accordance with the rotation of the post as the boat is steered.

9 Claims, 1 Drawing Sheet

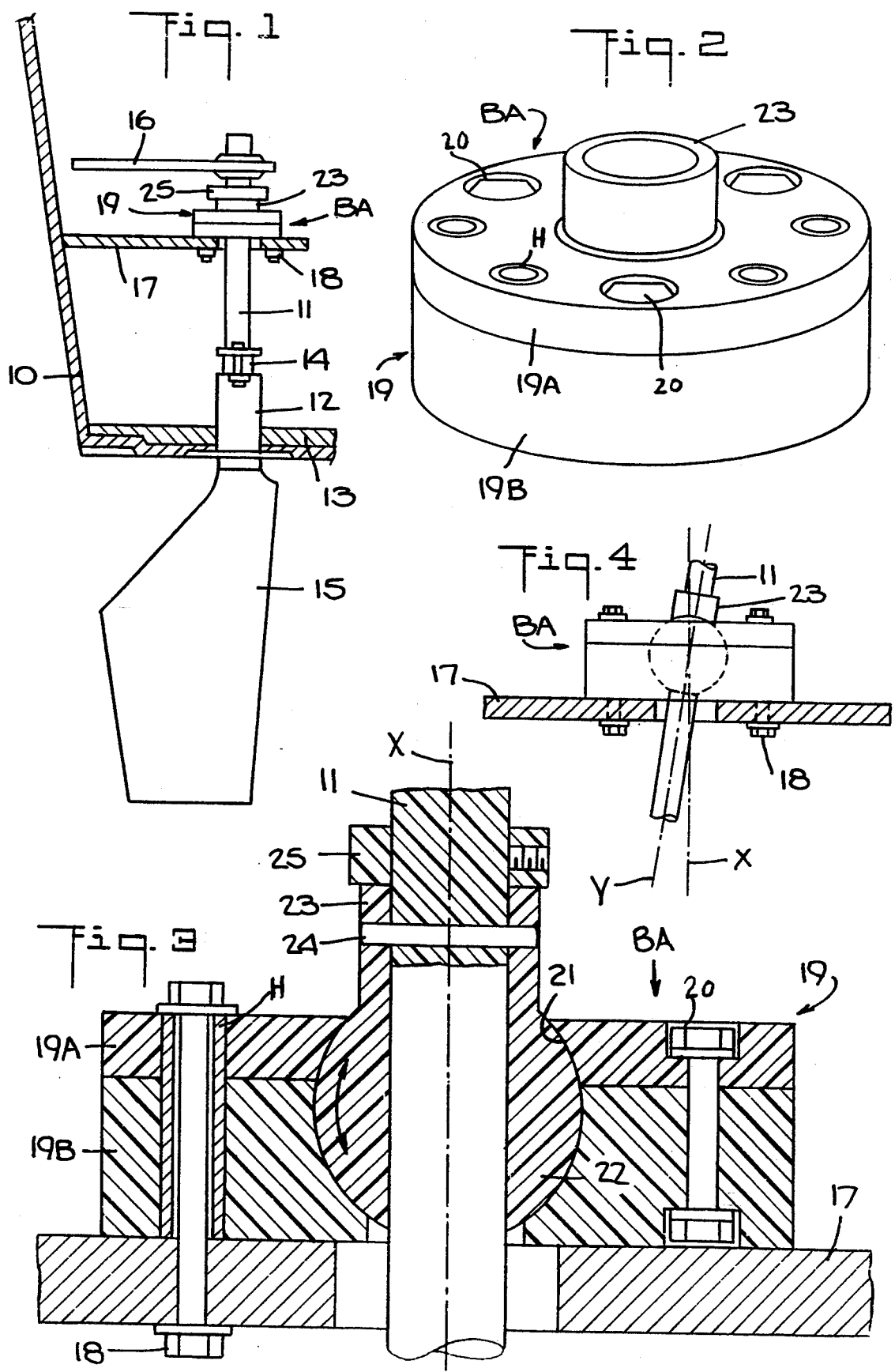

BALL AND SOCKET BEARING ASSEMBLY FOR A RUDDER POST

BACKGROUND OF INVENTION

1. Field of Invention

This invention relates generally to a bearing assembly for a rotatable rudder post installed in the stern of a vessel to maintain the post at a proper position, and more particularly to a ball and socket bearing assembly adapted to align itself with a rudder post extending therethrough regardless of the degree to which the post deviates from the vertical and is subjected to hydrodynamic forces which seek to displace the post.

2. Status of The Prior Art

A sailboat, a power boat or other type of vessel is steered by a rudder in the form of a flat surfaced structure or blade hinged to the stern of the vessel and controlled by a helm. When the boat advances in a straight course, the rudder is then in line with the boat. But if the rudder is turned by the helm to one side or the other, it offers sufficient resistance to the water impinging on its surface to deflect the stern and thereby change the direction in which the boat advances.

In a typical sail or power boat installation, the rudder which is below the hull is joined to a rudder post which passes through a bronze or brass sleeve fastened to the hull, the post terminating in a lever or steering arm functioning as the helm. The metal sleeve is sealed by a packing gland affixed thereto to prevent water from entering the boat. To maintain the rudder post in its proper upright position, a bearing assembly is provided that is supported on a horizontal plate or platform cantilevered from the stern at a position below the steering arm, the rudder post passing through this assembly. The bearing assembly is adapted to sustain the side loads to which the post is subjected as well as to prevent the rudder post from slipping down into the water.

It must be borne in mind that exerted on the rudder are hydrodynamic forces whose direction depend on the orientation of the rudder relative to the water stream impinging on its surface. These forces which are transmitted to the rudder post seek to laterally displace the post. The function of the bearing assembly through which the post passes is to resist these forces which are sometimes considerable, and thereby maintain the rudder post at its proper position.

However, while a rudder post under ideal circumstances should be vertical, in a typical boat installation, the axis of the post may deviate somewhat from the vertical. Hence a conventional bearing assembly for maintaining the rudder post position, when mounted on a horizontal support in the stern of the boat to engage the rudder post, will not be in line with the post unless it is shimmed or otherwise adjusted to bring about this alignment. This complicates the installation procedure and adds substantially to the expenses involved.

A similar problem arises in propeller-driven vessels in which the rotating shaft turning the propeller may not be accurately aligned, and thereby requires a bearing assembly that will align itself with the shaft regardless of the degree to which its axis of rotation deviates from a nominal axis. Thus the patent to Waters, U.S. Pat. No. 1,067,892, shows a shaft hanger for a propeller shaft that accommodates itself to inaccuracies in alignment. The Robbins patent U.S. Pat. No. 1,063,389, and the Schmitt patent U.S. Pat. 1,025,884 also show self-aligning ball and socket bearing arrangements for motor boat propeller shafts which allow freedom of movement to the shaft in the absence of true shaft alignment.

In these prior art, self-aligning ball and socket bearing assemblies, the shaft going through the bearing rotates with respect to the bearing, whereas the bearing which is received within the spheroidal cavity which defines the socket does not itself rotate. Hence in these prior arrangements, the bearing surface is the inner surface of the bearing through which the shaft extends. Once this bearing aligns itself with the shaft, it is fixed in place within the socket which houses the bearing; hence the outer surface of the bearing which engages the wall of the socket does not act as a bearing surface.

SUMMARY OF INVENTION

In view of the foregoing, the main object of this invention is to provide a ball and socket bearing assembly for a rotatable rudder post installed in the stern of a vessel to maintain the post at a proper position and to resist forces transmitted to the rudder post which seek to displace this post.

More specifically, an object of this invention is to provide a ball and socket bearing assembly of the above type which is adapted to align itself with a rudder post extending therethrough, regardless of the degree to which the post deviates from the vertical.

A significant feature of the invention resides in its capacity to absorb forces applied thereto by the rudder post resulting from hydrodynamic forces exerted on the rudder and transferred to the rudder post, for the forces to which the rudder post is subjected which seek to displace it are transmitted to the spheroidal section of the bearing which is nested in the conforming socket of the rigidly mounted journal box and are absorbed thereby.

Also an object of the invention is to provide a low-friction, high-strength ball and socket bearing assembly for a rudder post which can be mass produced at relatively low cost. An important advantage of the invention is that it can be easily installed; for regardless of the degree to which the rudder post deviates from the vertical, the bearing will automatically align itself with the post and no expedients or procedures are necessary to bring about this alignment.

Briefly stated, these objects are attained in a ball and socket assembly adapted to engage the post of a rudder installed in the stern of a boat and to maintain it at a proper upright position regardless of the degree to which the post deviates from the vertical and is subjected to hydrodynamic forces which seek to displace the post. The assembly consists of a journal box fixedly mounted on a support and having a spheroidal cavity, and a bearing through which the rudder post extends. The bearing is constituted by a spheroidal section that nests within the cavity of the box and a cylindrical section projecting from the box and pinned to the post whereby the bearing is in alignment with the post and its spheroidal section is caused to rotate within the cavity in accordance with the rotation of the post as the boat is steered.

BRIEF DESCRIPTION OF DRAWING

For a better understanding of the invention as well as other objects and further features thereof, reference is made to the following detailed description to be read in conjunction with the accompanying drawings, wherein:

FIG. 1 illustrates a rudder installed in the stern of a boat in which the rudder post passes through a ball and socket bearing assembly in accordance with the invention;

FIG. 2 is a perspective view of the assembly;

FIG. 3 is a section taken through the assembly; and

FIG. 4 illustrates the relationship of the rudder post and the bearing through which it passes when the axis of the post deviates from the vertical.

DESCRIPTION OF INVENTION

Referring now to FIG. 1, there is shown the stern 10 of a boat having installed therein a rudder post 11 whose lower end passes through a brass or bronze sleeve 12 fastened to the hull 13 of the boat, post 11 being joined to a rudder 15 disposed below the hull. Attached to metal sleeve 12 is a packing gland 14 which prevents water from leaking into the boat.

Coupled to the upper end of the upright rudder post 11 is a steering arm or lever 16 which makes it possible for a pilot to steer the boat. Rudder post 11 passes through an opening in a horizontal plate or platform 17 that is below the steering arm and is cantilevered from stern 10. The platform is formed of wood, fiberglass-reinforced plastic or other high strength material. Mounted on platform 17 by bolts 18 is a ball and socket bearing assembly BA through which the rudder post extends. Thus the rudder post is maintained in its upright position by sleeve 12 engaging the lower end of the post and by the bearing assembly BA adjacent its upper end.

As shown separately in FIGS. 2 and 3, the ball and socket assembly BA includes a journal box 19 formed by two superposed circular plates 19A and 19B of the same diameter, but of different width which are held together by a circular array of bolts 20. The plates are also provided with bore hole sleeves H to receive; the mounting bolts 18.

Plates 19A and 19B each having a central opening whose wall is contoured so that together these openings define an internal cavity or socket 21 having a spheroidal configuration.

The assembly also includes a bearing having an internal diameter matching the diameter of rudder post 11 which extends through the bearing. The bearing is constituted by a spheroidal lower section 22 whose form conforms to that of the spheroidal socket 21 of the journal box, and an upper cylindrical section 23 which is integral with the spheroidal section and projects above the journal box.

The spheroidal bearing section 22 nests within the spheroidal socket 21 of the journal box and is rotatable therein about its center. Hence the angular orientation of the bearing relative to the journal box is adjustable.

The cylindrical section 23 of the bearing is tied to rudder post 11 passing therethrough by a pin 24 inserted in a lateral bore extending through the cylindrical section and the rudder post. In practice, instead of a pin, one may use a set screw which is received in a threaded bore in the cylindrical section, the point of the screw pressing against the surface of the rudder post.

Thus, the bearing is joined to the rudder post and rotates with it as the post is turned by the steering arm in the clockwise or counterclockwise direction. FIG. 3 illustrates rudder post 11 in alignment with the vertical axis X, this being the ideal upright position. However, in the typical boat installation, the rudder post is somewhat inclined relative to the vertical, and it is essential, therefore, that the bearing engaging the rudder post not have a fixed position, but that it align itself with the existing axis of the rudder post.

In an assembly in accordance with the invention, the bearing, whose angular orientation with respect to the spherical socket 21 of the journal box is adjustable, aligns itself with rudder post 11, regardless of the degree to which the post deviates from the vertical axis X. Thus, as shown in FIG. 4, the axis Y of rudder post 11 is inclined with respect to vertical axis X, the bearing being aligned with the rudder post.

The danger exists that steering arm 16 coupled to rudder post 11 may become loose, as a consequence of which the rudder post which passes through the bearing assembly BA, and sleeve 12 may then be free to slip down into the water, with a resultant loss of the rudder. The pin 24, which joins rudder post 11 to the bearing, is likely in this event to be sheared by the downward force of the rudder post.

To prevent the rudder post from slipping down, attached by set screws to rudder post 11 and riding on the upper edge of cylindrical bearing section 23 is a collar 25. This collar prevents axial displacement of the post in the downward direction without, however, interfering with rotation of the post.

As pointed out in the background section, rudder 15 is subjected to hydrodynamic forces which are transferred to rudder post 11. When these forces are considerable, they seek to laterally displace the rudder post from its proper position. Because the post is tied in to the bearing, these forces are transmitted to the bulbous section 22 of the bearing which is in engagement with the wall of the spheroidal socket of the more massive journal box affixed to platform 17. The journal box acts to absorb these forces and prevent tilting or displacement of the post.

The bearing is molded or otherwise formed of a synthetic plastic material having a low coefficient of friction, preferably UHMW, an ultra-high molecular weight polyethylene having a coefficient of friction almost as low as TEFLON (tetrafluoroethylene). And the journal box (19A–19B) is preferably made of the same material. Since the rudder post is tied to the bearing and does not rotate relative to the bearing, but the ball-like section 22 of the bearing is rotatable within the cavity 21 of the journal box, very little resistance is offered to such rotation, for the bearing surfaces have a very low coefficient of friction. In practice, the bearing may be made of a porous, synthetic plastic material impregnated with a lubricant.

The advantage of forming journal box 19 of two plates which together define the spheroidal cavity 21 in which the bulbous section 22 of the bearing is nested is ease of assembly. In the assembly procedure, bulbous section 22 of the bearing is placed within the contoured opening of lower plate 19B, only the lower portion of this section nesting within the opening, the remaining portion of bulbous section 22 and the cylindrical section being exposed. Then upper plate 19A is placed over lower plate 19B, the cylindrical section 23 of the bearing projecting above plate 19B whose contoured opening then surrounds the upper portion of bulbous section 22, so that now the entire bulbous section is nested in the cavity. Then the two plates are riveted together.

Because the axial length of the bearing is made up of its bulbous and cylindrical sections, the rudder post joined to the bearing is supported by the bearing over a relatively long distance, such support resisting flexure of the rudder post.

While there has been shown and described a preferred embodiment of a ball and socket bearing assembly for a rudder post in accordance with the invention, it will be appreciated that many changes and modifications may be made therein without, however, departing from the essential spirit thereof.

We claim:

1. A ball and socket bearing assembly engaging a rudder post installed in the stern of a boat having a hull and maintaining its proper position regardless of the degree to which the post deviates from a vertical axis and is subjected to hydrodynamic forces seeking to displace the post, said assembly comprising:
   (a) a journal box mountable on a horizontal platform in the boat, said box having an internal spheroidal cavity; and
   (b) a bearing having a longitudinal bore through which the post extends, said bearing having a spheroidal section whose form conforms to that of the cavity, the spheroidal section being nested and rotatable in the cavity of the box and being confined thereby, and a cylindrical section integral with the spheroidal section and projecting out of an opening in the box, said bearing aligning itself with the post extending therethrough regardless of the degree to which it deviates from the vertical axis.

2. An assembly as set forth in claim 1, wherein said post terminates at its upper end in a steering arm, and said platform is disposed below said arm and is cantilevered from the stern.

3. An assembly as set forth in claim 2, wherein said post terminates at its lower end in a rudder disposed under the hull of the boat, the lower end of the post passing through a sleeve fastened to the hull.

4. An assembly as set forth in claim 1, wherein said cylindrical section is pinned to said post whereby rotation of the post causes rotation of the spheroidal section of the bearing within the socket.

5. An assembly as set forth in claim 1, wherein said journal box is formed of two superposed plates of different thickness, each plate having a contoured opening therein which, when the plates are joined together, define said spheroidal cavity.

6. An assembly as set forth in claim 5, wherein said plates are riveted together.

7. An assembly as set forth in claim 5, wherein said plates are formed of a synthetic-plastic material having a low coefficient of friction.

8. An assembly as set forth in claim 7, wherein said bearing is made of the same material.

9. An assembly as set forth in claim 1, further including a collar attached to said post and seated on the cylindrical section of the bearing to prevent downward axial displacement of the post.

* * * * *